Dec. 21, 1965   AKIRA TAKAHASHI ETAL   3,225,006
POLYMERIZATION OF ALDEHYDES USING AN ORGANIC
COMPOUND OR A SALT OF MERCURY AS CATALYST
Filed Oct. 9, 1962
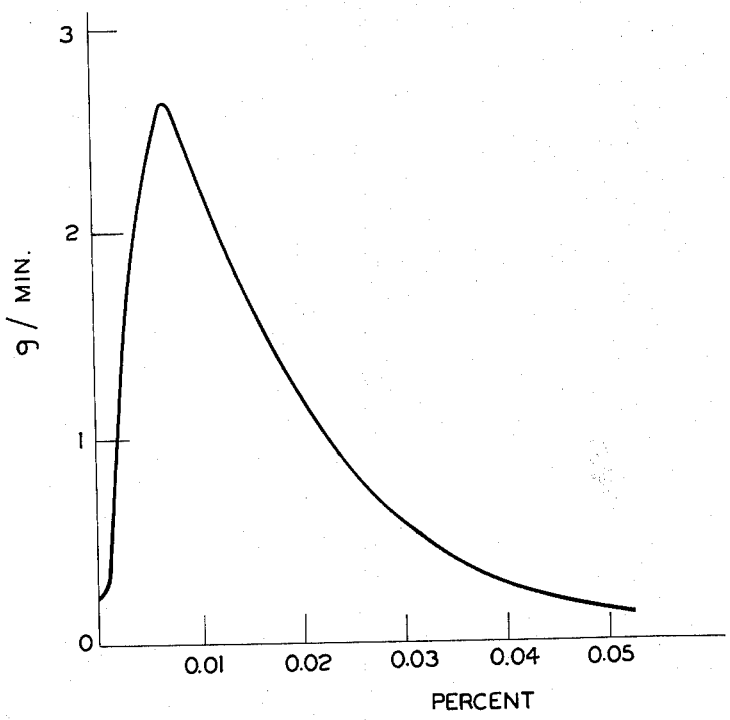
INVENTORS
AKIRA TAKAHASI
YUKIMITSU MITA
SHIGEO HAYASHI
BY *Nathaniel L. Leek*
ATTORNEY

United States Patent Office 3,225,006
Patented Dec. 21, 1965

3,225,006
POLYMERIZATION OF ALDEHYDES USING AN ORGANIC COMPOUND OR A SALT OF MERCURY AS CATALYST
Akira Takahashi, Kawasaki-shi, Kanagawa-ken, Yukimitsu Mita, Ohta-ku, Tokyo, and Shigeo Hayashi, Shimo-machi, Kohoku-ku, Yokohama, Japan, assignors to Showa Denko Kabushiki Kaisha, Tokyo, Japan, a corporation of Japan
Filed Oct. 9, 1962, Ser. No. 229,295
Claims priority, application Japan, Oct. 14, 1961, 36/36,799; Aug. 18, 1962, 37/34,144
8 Claims. (Cl. 260—67)

This invention relates to a method of polymerizing formaldehyde. More particularly the invention relates to a method of polymerizing a gaseous formaldehyde in an organic solvent in the presence of a mercury compound as the polymerization initiator. In addition, this invention comprehends a method of preparing high-molecular-weight formaldehyde polymers in which the rate of polymerization is enhanced as well as at the same time not only is it possible to regulate the molecular weight but also an improvement can be achieved in the thermal stability of the polymers by the incorporation of an organic acid or an organic acid anhydride in carrying out such a polymerization reaction.

It is an object of the invention to provide a polymerization initiator for the polymerization of formaldehyde.

Another object of the invention is to provide a method of obtaining high-molecular-weight formaldehyde polymers on an industrial scale.

A still another object of the invention is to provide a method of preparing high-molecular-weight formaldehyde polymers using an organic solvent.

A further object of the invention is to provide in carrying out such a polymerization reaction a method whereby the rate of polymerization is increased greatly as well as at the same time not only it is possible to regulate the molecular weight but also an improvement in the thermal stability of the polymers is achieved.

Other objects and advantages of the present invention will be apparent from the following detailed description thereof.

Heretofore, as polymerization initiators for polymerizing formaldehyde, the amines, particularly the tertiary amines, the metallic carbonyl compounds, the onium compounds and tertiary phosphine have been known.

And as the solvent to be used during the polymerization of formaldehyde a wide variety of organic solvents including the low boiling paraffins, the aromatic compounds and their substituted substances, chained or cyclic ethers and esters, etc, are known.

Generally, formaldehyde can be polymerized by introducing the formaldehyde into a solvent in which the aforementioned polymerization initiators have been dissolved or dispersed. And as the reaction conditions on this occasion, at normal atmospheric pressure or under pressure, an optional temperature that is above the melting point of the solvent but below its boiling point can be selected. For sake of convenience in performing the reaction operation, it is particularly preferred that the polymerization reaction be carried out at a temperature between −30° C. and about 70° C. at normal atmospheric pressure.

As the starting material formaldehyde gas to be employed in polymerizing formaldehyde to obtain high-molecular-weight formaldehyde polymers, that which is substantially anhydrous is preferred. Many methods have been known hitherto for obtaining substantially anhydrous formaldehyde gas. For example, there is the method in which the hydrous formaldehyde gas obtained by the pyrolysis of paraformaldehyde is dehydrated and purified by further passing through, for example, several cold temperature traps of about −20° C. Alternatively, there is the method that we have invented previously. Namely, by passing the hydrous formaldehyde gas through an inert solvent wherein has been suspended calcium chloride, a purified formaldehyde gas is obtainable with still greater efficiency and higher yield.

In polymerizing formaldehydes under the above-described conditions, this invention concerns a method of preparing formaldehyde polymers which is characterized in that as the polymerization initiator an inorganic salt of mercury or an organic compound containing as a substituent group an inorganic salt of mercury is employed.

While the inorganic salts of mercury to be used as the polymerization initiator may be any of the inorganic salts of mercury such as, for example, mercuric nitrate, mercurous nitrate, mercuric carbonate, mercuric sulfate, mercuric chloride, mercuric hydroxide, etc., mercuric nitrate and mercurous nitrate are particularly suitable.

And as the organic compound containing as a substituent group an inorganic salt of mercury which is usable as the polymerization initiator in this invention, there can be named the reaction product between a mercuric inorganic salt and either an aliphatic compound containing a double bond or an unsaturated aliphatic compound containing an aromatic substituent group or an alicyclic substituent group, and the reaction product of a mercuric inorganic salt and an aromatic compound. In the former case of the reaction with the aliphatic compound, the mercuric inorganic salt acts chiefly on the double bond of the aliphatic compound thereby splitting the double bond whereat the mercuric inorganic salt is substituted or added. And, in case of the reaction with the unsaturated compound containing an aromatic substituent group, depending upon conditions (generally when the temperature is low), the mercuric inorganic salt is substituted for or added to the double bond portion of the residual aliphatic group, whereas depending upon conditions (generally when the temperature is high), it is substituted for or added to the aromatic nuclear carbon and the double bond portion of the residual aliphatic group. On the other hand, in case of its reaction with the aromatic compound not containing an unsaturated substituent group, the mercuric inorganic salt is chiefly substituted directly onto the nuclear carbon of the aromatic compound. And, according to the invention, as the compounds containing as the substituent group a mercuric inorganic salt, those containing mercuric nitrates are most desirable. For instance, illustrating several examples thereof, there are included such as the mercuric nitrate substituted benzene obtained by reacting benzene with mercuric nitrate by either of the following reactions.

Namely, in an aqueous solution of nitric acid

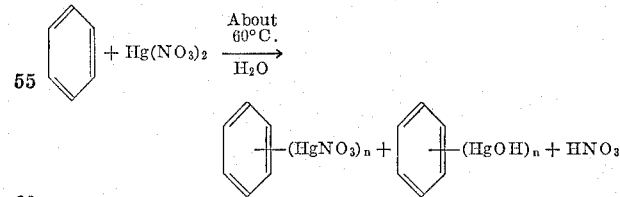

wherein $n$ is a value of 1 or more.

Alternatively, since upon reacting benzene with mercuric nitrate the nitric acid formed as the by-product still remains in its unchanged state, it is impossible to introduce only mercuric nitrate groups to each of the benzene nucleus, and mercuric hydroxide groups may also be introduced thereinto. So, in order to introduce only mercuric nitrate groups to the said nucleus, a method of adding further mercuric oxide and effecting its coexistence therein is adopted. In this instance, the nitric acid formed reacts with the mercuric oxide and reverts to mercuric nitrate.

When this is represented by a reaction equation, it is as follows:

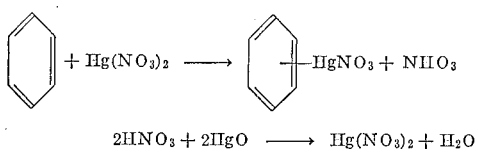

that is,

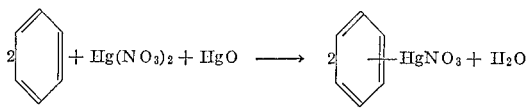

The mercuric nitrate substituted nitrobenzene as well as the mercuric nitrate substituted toluene are obtained by a similar reaction.

And further, from the unsaturated aliphatic compounds containing one or more unsaturated groups in their molecules, i.e., the unsaturated aliphatic hydrocarbons such as hexene, octene, nonene and decene, or the derivatives of the unsaturated aliphatic hydrocarbons such as oleic acid the mercuric nitrate substituted (or added) aliphatic compounds can be also obtained by reacting the above-mentioned aliphatic hydrocarbons with mercuric nitrate preferably in an alcohol such as methanol and ethanol.

The polymerization initiator to be used in this invention may also be in the form of a complex salt or double salt. It is to be understood that these also are included in the compounds containing the aforementioned mercuric inorganic salt or the organic compounds having as the substituent group said mercuric inorganic salt.

For reference, the following illustrate the method of preparing the organic compounds having an inorganic salt of mercury as the substituent group, which are used as polymerization initiators in this invention.

REFERENCE 1

Thirty-three grams of mercuric nitrate was dissolved in 100 cc. of a 35% nitric acid, to which was then added 8 grams of benzene, and the mixture was reacted for 1.5 hours at 62° C. with vigorous stirring. The white solid separated was washed with methanol and dried under vacuum. The white solid obtained was a mixture of mercuric nitrate substituted benzene and mercuric hydroxide substituted benzene and this in the form of a mixture possessed excellent catalytic activity.

REFERENCE 2

To 20 cc. of benzene were added 17 grams of mercuric nitrate, 5 grams of mercuric oxide and 25 grams of calcium sulfate, and the mixture was reacted for one hour at 65° C. in a nitrogen current. When after filtration, n-hexane in an equal quantity was added to the filtrate, white crystals were separated. When after washing with n-hexane and drying under vacuum, the melting point of these crystals was measured, it was 126° C. (whereas the value according to published literature is 128–131° C.). And when the mercury content was measured with thionalide, it was 55%. Therefore, the white crystals obtained were judged to be phenyl mercuric nitrate having the formula

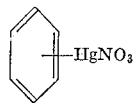

REFERENCE 3

When instead of the aforesaid benzene, toluene was employed in a completely identical manner, a mixture of mercuric nitrate substituted tolene and mercuric hydroxide substituted toluene or tolyl mercuric nitrate alone was obtained. The above mixture and tolyl mercuric nitrate both possessed excellent catalytic activity.

REFERENCE 4

When 10 grams of mercuric nitrate was added to 80 grams of nitrobenzene and was refluxed, the evolution of nitrogen oxide gas began. After about 30 minutes the evolution of gas ceased and with practically all of the solids of mercuric nitrate disappearing a homogeneous solution resulted. Upon addition of distilled water to this solution, yellow precipitates formed, which were washed and dried. The yellow powder obtained is believed to be that whose chief component is mercuric nitrate substituted nitrobenzene represented by the formula

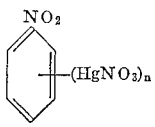

Its catalytic activity was very excellent.

As set forth in the above references, although it is possible to maintain the catalytic activity sufficiently high even in case of a compound in which benzene nucleus has been bonded to one residual mercuric nitrate group, needless to say, a compound which has been made to have more than one residual mercuric nitrate group by reacting a still greater amount of mercuric nitrate also possesses catalytic activity. However, when considered from the standpoint of the solubility of the polymerization initiator in an organic solvent, the compound to which has been bonded one residual mercuric nitrate group having a greater solubility is more advantageous.

While the inorganic salts of mercury or the organic compounds having as a substituent group an inorganic salt of mercury that are to be used in this invention as the polymerization initiator can be used as a initiator for polymerizing formaldehyde in the form in which they are dissolved or suspended in such solvents as have already been mentioned, generally, in the invention, in selecting and using the polymerization initiator and solvents it is preferable that the combinations thereof be such that if the solvent happens to be one in which the initiator is insoluble the solvent be one which can dissolve formaldehyde, and on the other hand, if the solvent happens to be one in which formaldehyde is insoluble, the solvent be one which can dissolve the initiator. As the solvent, any of those mentioned hereinbefore may be used so long as they are inert with respect to the polymerization of formaldehyde.

However, according to this invention, it is possible to fully polymerize formaldehyde even in a heterogeneous system comprising that in which the polymerization initiators such as mentioned hereinabove have been merely suspended and dispersed in a solvent that does not dissolve formaldehyde in the least.

In general, due to the fact that the organic compounds containing an inorganic salt of mercury as a substituent group usually dissolve in the solvents that are of the same type or have the same characteristics as said unsubstituted organic compound and thus the selection of such compound as the solvent is highly suitable. Furthermore, in using these organic compounds containing an inorganic salt of mercury, it is not necessarily required that the independent substance thereof be first prepared and then added to the solvent. For example, instead of separating the mercuric salt substituted compound from the reaction product of benzene and mercuric nitrate, the above reaction product without effecting any separation may be added directly to the solvent, for example, n-heptane to effect the polymerization reaction.

In addition, if nitrobenzene is used as the solvent and mercuric nitrate is added as the polymerization initiator, while the mercuric nitrate itself is suspended in the nitrobenzene, a part thereof reacting with the nitrobenzene forms mercuric nitrate substituted nitrobenzene. Hence, this may be used as it is, or the supernatant liquid thereof may also be used. Thus, while an inorganic salt of mercury used as a catalyst in this invention, when added to the solvent as it is, manifests an excellent catalytic action, on the other hand, since in many instances, said inorganic salt of mercury reacts with a part of said solvent thereby forming a reaction mixture in the state of solution or suspension, such reaction mixture also manifests excellent catalytic activity.

The hereinabove-described inorganic salt of mercury or the organic compound containing an inorganic salt of mercury as the substituent group that is used as the polymerization initiators according to the invention, when compared with the various hitherto known organic initiators, possesses noteworthy characteristics such as that its cost is exceedingly low, and not only is it easy to prepare and handle but also that it forms formaldehyde polymers of very high molecular weight at constantly high rates of polymerization. Furthermore while the hereinabove-described polymerization initiators have sufficient catalytic activity at low temperatures below 0° C., generally at a reaction temperature range of 0–60° C. particularly excellent catalytic activities are manifested, and under such condition the induction period of the reaction is shortened to a marked extent. In addition, in the case of the organic compound containing an inorganic salt of mercury as the substituent group according to this invention, by an appropriate selection of the components of the organic compound it becomes possible to dissolve it in even a hydrocarbon type solvent of low boiling point such as, for example, heptane. Hence the polymerization of formaldehyde by the use of such a low boiling solvent becomes possible thereby simplifying greatly the operations after the polymerization such as the separation and purification of the polymer.

In carrying out the polymerization operations according to the invention, the batch process may be adopted. Alternatively, a process may be employed wherein a solvent containing a polymerization initiator is introduced continuously into a reactor and the polymer formed by continuously introducing formaldehyde gas into the top or bottom part of the reactor is continuously removed to the outside of the reactor in a state of a slurry. Furthermore, although the formaldehyde gas may be used in its undiluted state, it may also be used in a state in which it has been diluted with an inert gas, for example, nitrogen. Needless to say, the unreacted formaldehyde gas that escapes to the outside of the system can be used over again by returning it to the reactor. The air that is present in the system prior to commencement of the polymerization reaction may also be replaced with an inert gas, for example, such as nitrogen.

Thus, according to the present invention, the formaldehyde polymer obtained, having high molecular weight and high crystallinity, it is possible to obtain a wide variety of stable shaped articles, for example, such as films and many kinds of molded products. Hence, they have many applications over a wide range.

Furthermore, according to the method of this invention, by carrying out the polymerization reaction with the addition of an organic acid or an organic acid anhydride along with the mercury compound as the polymerization initiator, it becomes possible to effect a still greater increase in the rate of polymerization as well as to not only make possible the regulation of the molecular weight but also improve the thermal stability of the polymer.

As polymerization initiators, the amines, the phosphines, the metallic carbonyl compounds and the onium compounds are known. Since when using these initiators the acids, water alcohol, etc. causes a decrease in the molecular weight of the polymers formed, a method in which this action is utilized for regulating the molecular weight is known from British Patent 766,862.

However, in a method in which the aforesaid initiator is used with acids, water and alcohols, the action is that of merely lowering the molecular weight, there being no actions simultaneously of increasing the rate of polymerization as well as effecting an improvement in the thermal stability of the polymer.

According to the method of this invention, a polymer having a very high degree of polymerization, namely an inhererent viscosity of 3 or more, is formed. However, there occurs instances when it becomes necessary to lower the degree of polymerization to a suitable degree. If, for this purpose water or methanol is added in a suitable quantity as the chain transfer agent and the polymerization reaction carried out, although the degree of polymerization of the polymer formed is lowered, actions for increasing the rate of polymerization and also improving the thermal stability obtained, cannot be obtained in which simultaneously the rate of polymerization is increased materially and the thermal stability is also improved.

As a result of our researches in the method of the present invention, which comprises polymerizing formaldehydes in an organic solvent in the presence of an inorganic salt of mercury or an organic compound containing an inorganic salt of mercury as a substituent group, for finding a method of preparing high-molecular-weight formaldehyde polymers in which the rate of polymerization is promoted as well as at the same time not only the molecular weight of the polymer regulated but also the thermal stability thereof is improved, we found that by effecting the copresence of an organic acid or an organic acid anhydride not only could the degree of polymerization be suitably regulated but also at the same time the rate of polymerization could be increased markedly as well as an improvement in the thermal stability of the polymer could be achieved.

Accordingly, it is to be understood that the present invention comprehends the method of carrying out the polymerization reaction by adding an organic acid or an organic acid anhydride together with the mercury compound as the polymerization initiator.

As the acid to be added with the salts of mercury as mentioned hereinabove, any of the organic acids or organic acid anhydrides may be utilized. Such organic acids include the aliphatic organic acids such as, for example, acetic acid, propionic acid, butyric acid, etc., alicyclic organic acids such as, for example, naphthenic acids, aromatic organic acids such as, for example, benzoic acid, toluylic acid, etc., and the aliphatic or aromatic acid anhydrides such as, for example, acetic anhydride, phthalic anhydride, etc. These organic acids or organic acid anhydrides can be utilized singly or in combinations of two or more thereof. Moreover, these organic acids or organic acid anhydrides that are used in the present invention may be those which dissolve in the reaction solvent or those which are partly soluble in minute amounts.

While it is not yet clear by what mechanism the organic acids or organic acid anhydrides with the salts of mercury which are the initiators manifest the action for regulating the molecular weight which is accompanied by a marked increase in the rate of polymerization, according to our presumptions, it is believed that this action is due to either the formation of a highly active complex or the complicated mutual actions between the initiator, the monomer and the reaction solvent. In any event, the present invention is not to be limited by the presumption of such a mechanism.

When phenyl acetate of mercury was compared with phenyl nitrate of mercury as to its polymerizing activity as an initiator, hardly any difference was observed. Hence, it cannot possibly be deemed that phenyl acetate of mercury is formed from the mixture of acetic acid and phenyl nitrate of mercury and thus this invites an increase in the catalytic activity so as to be accompanied by a marked increase in the rate of polymerization.

When the polymerization reaction is carried out by the method of this invention where a mercuric initiator is used in the presence of an organic acid or an organic acid anhydride, it is characterized in that not only is the molecular weight of the polymer formed regulated but at the same time the rate of polymerization is also increased, as shown in the examples given hereinafter. In addition, the thermal stability can also be improved to an extent that equals to or surpasses the polymers obtained by the conventional methods. When as the molecular weight regulating agent methanol is used by the conventional method, the rate of polymerization is not affected at all and merely the degree of polymerization changes.

On the other hand, according to the method of this invention, a remarkable increase in the rate of polymerization is observed at the same time. Thus, it is very distinctive as compared with the conventional methods which merely lower the degree of polymerization. An example thereof will be explained with reference to FIG. 1.

FIG. 1 is a graphic representation of the relationship between the rate of polymerization (g./min.) and the acetic acid concentration (percent) when, as the initiator, 2 mg. of phenyl nitrate of mercury was dissolved in 250 cc. cyclohexane and acetic acid in an amount of 0–0.5% by weight of the solvent was added, following which the polymerization reaction was carried out at 35° C. The rates of polymerization are indicated on the vertical axis and acetic acid concentration on the horizontal axis. As is apparent from the figure, for example, when phenyl nitrate of mercury was used as the initiator and acetic acid was caused to be copresent as the organic acid, at an acetic acid concentration of about 0.003–0.01%, it can be seen that a polymerization rate can be obtained which is 7–8 times that when the acetic acid was not copresent.

When effecting the copresence of an organic acid or an organic acid anhydride according to the method of this invention, the polymerization is possible within a wide range of conditions. However, as the reaction temperature that between −30° C. and +70° C. is preferred. On the other hand, while the amount of the organic acid or the organic acid anhydride to be used can be suitably selected or varied in accordance with the acid, solvent and initiator combination that is used for obtaining the polymer of the desired degree of polymerization, from the standpoint of increasing the rate of polymerization the object can be achieved by selecting the said amount as 0.001 to 0.1% by weight, usually 0.002 to 0.05% by weight being preferred, based on the solvent.

As regards the concentration of the polymerization initiator, while it will manifest the polymerizing activity in an amount of 0.0001% by weight, based on the solvent, or even less, in actual practice it is an advantage to select the above concentration of about 0.0001% by weight or more. As the rate of polymerization increases in proportion to the concentration of the initiator, a high concentration of about 1% by weight can be used in the case where a high rate of polymerization is desired. Usually the concentration of about 0.0001–0.1% by weight is suitable in consideration of the removal of the heat evolved during the reaction and a rate of polymerization that is practical.

In effecting the copresence of the organic acids or organic acid anhydrides with the salts of mercury as the initiator, these acids may be added in advance to the reaction solvent through which is then passed the formaldehyde gas. Or, the vapor of the acid may be added in advance to the formaldehyde gas which is then introduced into the reaction solvent containing the initiator. In any event, so long as the reaction is carried out in a state in which the organic acid or organic acid anhydride is copresent, the timing for adding above materials can be changed suitably in accordance with the species of acid, the species of solvent, the operational procedures, etc. However, from the standpoint of the ease of reaction operations, it is of greater convenience if the acid is added in advance to the solvent.

Thus in the present invention when, besides the salts of mercury as the initiator, organic acids or organic acid anhydrides are used with the initiator, it becomes possible to polymerize at markedly high rates of polymerization formaldehydes to polymers having molecular weights regulated to the desired degree of polymerization. In addition, it is still more satisfactory since the thermal stability of the polymers formed, despite their degree of polymerization having been lowered, manifests results that are equal to, if not better than, that in which an acid has not been used together.

The invention will be more clearly understood by referring to the examples, which follow. In the examples the vicosity indicated is the inherent viscosity $[\eta] = ln\ \eta_{r/c}$ ($\eta_r$ is the relative viscosity) measured at 60° C. on a solution of 0.2% of the formaldehyde polymer in p-chlorophenol containing 2% of alpha-pinene.

It is to be understood that the following examples illustrate the nature of the invention but are not intended to limit it in any manner except as it is limited in the appended claims.

*Example 1*

Paraformaldehyde fully dried at 80° C. under reduced pressure, was gradually and continuously pyrolyzed at 180° C. The thus obtained formaldehyde gas was dried by being passed through 2 U-tube traps maintained respectively at −20° C. and −30° C. And it was used as the starting formaldehyde monomer.

To 250 cc. of nitrobenzene which was distilled under vacuum and the moisture content of which was rendered substantially a value of zero with active alumina was added 30 mg. of mercuric nitrate likewise vacuum-dried, which was then refluxed for 10 minutes. The supernatant liquid exhibited a color reaction of mercuric ion with dithizone.

The polymerizing vessel was provided with an inlet and outlet for the formaldehyde gas, a thermometer, and an agitator.

After the inside of the system was completely replaced with dry nitrogen, the solvent containing the above polymerization initiator was transferred to a polymerization vessel, and after raising the temperature to 25° C., formaldehyde was introduced. After an induction period of about 14 minutes the polymerization started, and the separation of polymer began. After about 10 minutes the viscosity of the reaction system rose so as to render impossible the stirring, at which time the introduction of the monomer was stopped. The polymer obtained after being suction-filtered was washed once with benzene and three times with acetone, and thereafter dried for 7 hours in a vacuum drier at 50° C., whereby was obtained 11.2 g. of polymeric formaldehyde having a viscosity of 1.98.

*Example 2*

Thirty mg. of the mercuric nitrate substituted toluene as described in Reference 3 was dissolved in 250 cc. of toluene, and formaldehyde gas was introduced therein as in Example 1.

About 20 minutes after introduction of the formaldehyde gas the polymerization began and the separation of polymers was observed. After 20 minutes of polymerization time, 14 grams of a polymeric formaldehyde having a viscosity of 1.21 was obtained.

*Example 3*

When formaldehyde was polymerized exactly as in Example 2, except that the polymerization temperature was 60° C., after an induction period of about 18 minutes, 12 grams of a polymeric formaldehyde having a viscosity of 1.1 was obtained.

*Examples 4, 5 and 6*

As in Example 1, the pyrolysis of paraformaldehyde, the purification of formaldehyde, and the purification and the drying of the polymer obtained were performed.

Using as the polymerization initiator mercuric nitrate, different solvents were employed and the polymerization was effected. The results were as shown in Table I.

TABLE I

| Example | Polymerization Initiator (mg.) | Solvent (cc.) | Reaction Temperature (° C.) | Induction Period (min.) | Polymerization Time (min.) | Polymer Yield (g.) | [η] |
|---------|-------------------------------|---------------|-----------------------------|-------------------------|----------------------------|--------------------|-----|
| 4 | Hg(NO₃)₂ 10 ᵃ | Dioxane 250 | 25 | 20 | 15 | 13 | 0.90 |
| 5 | Hg(NO₃)₂ 10 ᵇ | Ethyl ether 250 | 5 | 30 | 20 | 5 | 0.79 |
| 6 | Hg(NO₃)₂ 10 ᵇ | Methylene chloride 250 | 7 | 20 | 15 | 7 | 1.00 |

ᵃ The polymerization initiator was suspended in the solvent and used.
ᵇ The polymerization initiator dissolved in the solvent.

*Example 7*

Commercially available paraformaldehyde for industrial use in granules of 2–3 mm. diameter, being dried under vacuum at 80° C. for 8 hours, was introduced at the rate of 1–1.3 grams per minute into dioctylphthalate of 180–200° C. contained in a reactor which was completely replaced with nitrogen. The gas resulting from pyrolysis was passed through one −20° C. and two −30° C. U-tube traps thereby effecting purification. The so obtained formaldehyde was used as the starting material.

Next, a 500 cc. four-necked flasked provided with an agitator and a thermometer as well as an inlet and an outlet for formaldehyde gas was completely replaced with nitrogen. In this was placed 250 cc. of benzene dried with sodium and 10 mg. of the mercuric nitrate substituted benzene as obtained in Reference 1, and while vigorously stirring this mixture and maintaining a temperature of 50° C., formaldehyde was introduced. About 8 minutes later, the polymerization began. Then after continuing the introduction of the formaldehyde gas for 15 minutes, the polymerization reaction was stopped. The polymer obtained was separated by filtration, following which it was washed, then vacuum-dried whereby was obtained 7 grams of polyoxymethylene (a formaldehyde polymer) whose viscosity was 1.68.

*Example 8*

Polymerization of formaldehyde was effected exactly as in Example 7, except that 4 mg. of the phenyl mercuric nitrate, as described in Reference 2, was dissolved with heating in 250 cc. of benzene dried with sodium and the reaction temperature was 30° C. After an induction period of 9 minutes followed by continuance of the polymerization reaction for another 10 minutes, 13.3 grams of polymeric formaldehyde (viscosity 1.3) was obtained.

*Example 9*

When the polymerization of formaldehyde was effected exactly as in Example 8, except that instead of the 250 cc. of benzene 250 cc. of n-heptane was used and a reaction temperature of 40° C. was employed, after an induction period of 2 minutes the polymerization began. The polymerization reaction was continued for another 15 minutes resulting in 6.8 grams of polymeric formaldehyde having a viscosity of 4.2 being obtained.

*Example 10*

This example was performed exactly as Example 7, except that 250 cc. of n-heptane dried with active alumina was placed in a polymerization reactor, in which was then suspended 10 mg. of tolyl mercuric nitrate, as obtained in Reference 3, after which formaldehyde gas (obtained in the same manner as in Example 7) was introduced at 50° C. The polymerization began in 4 minutes, after which the introduction of the formaldehyde was continued for another 15 minutes whereby 7.0 grams of polyoxymethylene with a viscosity of 1.12 was obtained.

*Example 11*

When 10 mg. of the yellow solids obtained in Reference 4 were dissolved in 250 cc. of nitrobenzene, and formaldehyde was polymerized at a reaction temperature of 25° C., the separation of polymer began 4 minutes after introduction of the formaldehyde gas, and with a polymerization time of 5 minutes 7 grams of polymeric formaldehyde were obtained. The viscosity of this polymer was 1.3.

*Example 12*

When to a mixed solution of 7.11 grams of oleic acid and 10 cc. of methanol 8.25 grams of mercuric nitrate was added, it gradually dissolved, and when heated it became a yellow solid. This solid was vacuum-dried. About 10 mg. of this solid was added to 250 cc. of nitrobenzene, and after refluxing for 10 minutes the supernatant liquid was used as the polymerization solution and the polymerization reaction was effected as in Example 1. Upon polymerizing for 15 minutes at 30° C., 11.2 grams of polymeric formaldehyde was obtained. The viscosity of this polymer was extremely great that measurement thereof was impossible, it being such that a thread could be spun from a 0.2% chlorophenol solution of it at 60° C. It was capable of being formed into a very excellent film and fiber.

*Example 13*

The same yellow solid mentioned in Example 12 was refluxed in n-heptane for 10 minutes, after which the supernatant liquid was used as the polymerization solution and the polymerization was effected as in Example 12. At a reaction temperature of 25° C., in 18 minutes 2.6 grams of polymeric formaldehyde having a viscosity of 2.73 was obtained and an excellent film was made therefrom.

*Example 14*

When 16.6 grams of mercuric nitrate was added to 14.1 grams of oleic acid and stirred at room temperature, it gradually dissolved. Taking a portion of this solution, the unreacted oleic acid was removed with n-heptane and a solid addition product was obtained. This was washed with a small quantity of acetic acid and methanol, after which it was vacuum-dried. Double bonding was not detected by the bromination method, and the result of the quantitative analysis for mercury was 38.7% (calculated value 33.1%).

When 3 mg. of the above addition product was added to 250 cc. of n-heptane, and after refluxing of 15 minutes, the supernatant liquid was used and polymerization effected at a reaction temperature of 45° C., after an induction period of about 5 minutes, in 15 minutes 4.7 grams of polymeric formaldehyde having a viscosity of 1.9 was obtained.

*Example 15*

A slurry consisting of 1 liter of heptane and 100 grams of calcium chloride was placed in a horizontal type gas purifier jacketed and equipped with a glass agitator of 60 mm. in inside diameter and 300 mm. long. While maintaining the temperature at 50° C. and with vigorous agitation, a paraformaldehyde pyrolyzed gas was introduced into this slurry from one end at the rate of 1 gram per minute and withdrawn from the other end. Formaldehyde gas thus dehydrated and purified was, as in Example 2, introduced at 25° C. into a supernatant liquid resulting from the reflux treatment of 30 mg. of mercuric nitrate in 250 cc. of toluene. After an induction period of about 23 minutes polymerization began, and with 15 minutes of polymerization time 13 grams of polymeric formaldehyde was obtained, the viscosity of which was 0.90.

*Example 16*

The polymerization reaction was performed as in Example 15 using as the polymerization initiator 5 mg. of mercuric carbonate, whereby was obtained 3.4 grams of polymeric formaldehyde having a viscosity of 1.2.

*Example 17*

When, after adding 20 mg. of mercurous nitrate to 250 cc. of nitrobenzene and refluxing for 10 minutes, the supernatant liquid thereof was placed in a reactor, a dry gas of formaldehyde introduced therein and the polymerization reaction performed, after an induction period of about 12 minutes and a polymerization time of 15 minutes, 19.1 grams of polymeric formaldehyde having a viscosity of 1.45 was obtained.

*Example 18*

When 10 mg. of mercurous nitrate was suspended in 250 cc. of toluene, and formaldehyde gas was introduced at a reaction temperature of 50° C., after an induction period of about 11 minutes 6.2 grams of polymeric formaldehyde was obtained within a polymerization time of 5 minutes. The viscosity of this polymer was 1.7.

*Example 19*

As the starting material monomer, formaldehyde obtained by decomposing in dioctylphthalate at 180° C. paraformaldehyde thoroughly dried under reduced pressure at 80° C. followed by cooling with water and thereafter dehydrated and purified by passing through a pipe cooled to −25° C. and four traps likewise cooled to −25° C. was used. This was washed with sulfuric acid, caustic soda and distilled water in the sequence given, after which it was rectified by adding metallic sodium. Then the formaldehyde was polymerized using as a solvent cyclohexane having a water content of 10 p.p.m. dried with activated alumina. In a solution comprising 250 cc. of cyclohexane to which was added 0.01% by weight (about 50 mol times of the initiator) of acetic acid, 2 mg. (6 millimols) of phenyl nitrate of mercury was added as the initiator and dissolved therein, after which the solution was transferred to a 500 cc. 4-necked flask. While maintaining the reactor at 35° C. with vigorous agitation the aforesaid purified formaldehyde was introduced. About 16 minutes after the start of the introduction of the formaldehyde, the reaction began.

And at a rate of 1.72 g./min., i.e., within 5 minutes, 13.6 grams of polymer was obtained. This polymer, which had a viscosity of 2.59, was capable of forming excellent films.

On the other hand, when formaldehyde was polymerized in this example without adding the acetic acid but with the other conditions being otherwise the same, with an induction period of about 14 minutes a polymer having a viscosity of 3.88 was obtained at the rate of 0.30 g./min. The rate of polymerization was 17.5% of that of this example in which was added 0.01% of acetic acid.

*Example 20*

Except that a change was made to 0.02% by weight, based on the solvent, in the amount of the acetic acid that was added, otherwise the same procedures were followed as in Example 1 in polymerizing the formaldehyde. In 10 minutes 18.0 grams (1.8 g./min.) of a polymer having a viscosity of 2.06 was obtained.

*Example 21*

When the same procedures were followed as in Example 1 in polymerizing the formaldehyde, excepting that the acid added was changed to 0.04% by weight of butyric acid, after an induction period of about 27 minutes, a polymeric material having a viscosity of 1.68 was obtained at a polymerization rate of 1.42 g./min.

*Example 22*

Instead of adding acetic acid, 0.04% by weight of acetic anhydride, based on the solvent, was added; otherwise the same procedures as in Example 1 were followed to polymerize the formaldehyde whereby was obtained at the rate of 0.90 g./min. a polymeric material having a viscosity of 2.61, which possessed very excellent film moldability.

*Example 23*

Using a solvent comprising a supernatant liquid of a mixture obtained by adding 50 mg. of the mercuric nitrate substituted (or added) oleic acid in 250 cc. of n-heptane and refluxing for 15 minutes, to which supernatant liquid was then added 0.01% by weight of acetic acid based on said liquid, formaldehyde was polymerized at a temperature of 35° C. in said solvent. After an induction period of about 9 minutes, a polymer having a viscosity of 2.59 was obtained at the rate of 1.85 g./min.

On the other hand, when the same polymerization reaction was carried out without adding acetic acid, a polymer having a viscosity of 4.01 was obtained at the polymerization rate of 0.52 g./min. That is to say, by the addition of the acetic acid the rate of polymerization attained was 3.6 times that of the instance when the acetic acid was not added.

What is claimed is:

1. A process for preparing an addition polymer of formaldehyde comprising introducing substantially anhydrous monomeric formaldehyde gas into an organic solvent in the presence of a polymerization initiator at a temperature ranging from the minimum temperature at which formaldehyde can be maintained in said gaseous state to 70° C., characterized in that the polymerization reaction is carried out in the presence of at least one mercury compound selected from the group consisting of
   (A) $Hg_nX_m$ wherein X is selected from the group consisting of $NO_3$, halogen, $CO_3$, $HCO_3$, $SO_4$, and —OH, and $n$ and $m$ are integers ranging from 1 to 2,
   (B) $R(HgNO_3)_r$ wherein R is selected from the group consisting of phenyl group, $NO_2$ substituted phenyl group, low alkyl substituted phenyl, and $r$ is an integer ranging from 1 to 3,
   (C) $R'(HgNO_3)$ wherein R' is selected from the group consisting of alkoxy substituted aliphatic hydrocarbon group, alkoxy substituted and carboxy substituted aliphatic hydrocarbon groups, as the polymerization initiator.

2. The process according to claim 1 wherein said mercury compound is selected from the group consisting of mercuric nitrate, mercurous nitrate, mercury carbonate, mercury bicarbonate, mercury sulfate, mercuric chloride, mercuric hydroxide, phenyl, mercuric nitrate, tolyl mercuric nitrate, nitrophenyl mercuric nitrate, hexyl mercuric nitrate, octyl mercuric nitrate, nonyl mercuric nitrate, decyl mercuric nitrate and mercuric nitrate-oleic acid adduct.

3. The process according to claim 1 wherein said mercury compound is in solution in said organic solvent.

4. The process according to claim 1 wherein said mercury compound is in suspension in said organic compound.

5. A process for preparing an addition polymer of formaldehyde comprising introducing substantially anhydrous monomeric formaldehyde gas into an organic solvent in the presence of a polymerization initiator at a temperature ranging from the minimum temperature at which formaldehyde can be maintained in said gaseous state to 70° C., characterized in that the polymerization reaction is carried out in the presence of at least one mercury compound selected from the group consisting of mercuric nitrate, mercurous nitrate, mercury carbonate, mercury bicarbonate, mercury sulfate, mercuric chloride, mercuric hydroxide, phenyl mercuric nitrate, tolyl mercuric nitrate, nitrophenyl mercuric nitrate, hexyl mercuric nitrate, octyl mercuric nitrate, nonyl mercuric nitrate, decyl mercuric nitrate and mercuric nitrate-oleic acid adduct as the polymerization initiator and at least one acid and acid anhydride selected from the group consisting of acetic acid, propionic acid, butyric acid, naphthenic acid, acetic acid and phthalic anhydrides.

6. The process according to claim 1 wherein the polymerization reaction is carried out in the pressure of a molecular weight regulating agent selected from the group consisting of organic acids and organic acid anhydrides, said regulating agent being present in addition to said polymerization initiator.

7. The process according to claim 6 wherein said molecular weight regulating agent is present in the reaction system in a concentration of 0.001–0.1% by weight based on said organic reaction solvent.

8. The process according to claim 6 wherein said molecular weight regulating agent is selected from the group consisting of acetic acid, propionic acid, butyric acid, naphthenic acid, acetic acid and phthalic anhydrides.

References Cited by the Examiner

UNITED STATES PATENTS 2,848,437  8/1958  Langsdorf et al. _____ 260—67
3,005,799  10/1961  Wagner _____ 260—67

WILLIAM H. SHORT, *Primary Examiner.*